United States Patent
Tan et al.

(10) Patent No.: US 12,361,553 B2
(45) Date of Patent: Jul. 15, 2025

(54) SYSTEM AND METHODS FOR INFERRING THICKNESS OF OBJECT CLASSES OF INTEREST IN TWO-DIMENSIONAL MEDICAL IMAGES USING DEEP NEURAL NETWORKS

(71) Applicant: GE Precision Healthcare LLC, Waukesha, WI (US)

(72) Inventors: Tao Tan, Nuenen (NL); Máté Fejes, Budapest (HU); Gopal Avinash, San Ramon, CA (US); Ravi Soni, San Ramon, CA (US); Bipul Das, Chennai (IN); Rakesh Mullick, Bangalore (IN); Pál Tegzes, Budapest (HU); Lehel Ferenczi, Budapest (HU); Vikram Melapudi, Bangalore (IN); Krishna Seetharam Shriram, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/497,912

(22) Filed: Oct. 30, 2023

(65) Prior Publication Data
US 2024/0078669 A1   Mar. 7, 2024

Related U.S. Application Data

(62) Division of application No. 17/192,804, filed on Mar. 4, 2021, now Pat. No. 11,842,485.

(51) Int. Cl.
G06T 7/00 (2017.01)
G06N 3/08 (2023.01)
G06T 15/08 (2011.01)

(52) U.S. Cl.
CPC ............ G06T 7/0012 (2013.01); G06N 3/08 (2013.01); G06T 15/08 (2013.01); G06T 2207/10088 (2013.01); G06T 2207/10104 (2013.01)

(58) Field of Classification Search
CPC ................ G06T 7/0012; G06T 15/08; G06T 2207/10088; G06T 2207/10104; G06N 3/08
See application file for complete search history.

(56) References Cited

U.S. PATENT DOCUMENTS 11,430,176 B2 *  8/2022  Levanony ............... G06N 3/08
11,514,573 B2 * 11/2022  Huang ................. G06F 3/0485
(Continued)

FOREIGN PATENT DOCUMENTS

CN      111611993 A     9/2020
KR    20140105101 A     9/2014
(Continued)

OTHER PUBLICATIONS

Moturu, A. et al., "Creation of Synthetic X-Rays to train a Neural Network to Detect Lung Cancer," Semantic Scholar Website, Available Online at https://www.semanticscholar.org/paper/Creation-of-Synthetic-X-Rays-to-Train-a-Neural-to-Moturu-Chang/21b248300369c372457b025bfe44ee7f6382aacd, Available as Early as Jan. 2018, 16 pages.
(Continued)

Primary Examiner — Shefali D Goradia

(57) ABSTRACT

Methods and systems are provided for inferring thickness and volume of one or more object classes of interest in two-dimensional (2D) medical images, using deep neural networks. In an exemplary embodiment, a thickness of an object class of interest may be inferred by acquiring a 2D medical image, extracting features from the 2D medical image, mapping the features to a segmentation mask for an
(Continued)

object class of interest using a first convolutional neural network (CNN), mapping the features to a thickness mask for the object class of interest using a second CNN, wherein the thickness mask indicates a thickness of the object class of interest at each pixel of a plurality of pixels of the 2D medical image; and determining a volume of the object class of interest based on the thickness mask and the segmentation mask.

19 Claims, 11 Drawing Sheets
(6 of 11 Drawing Sheet(s) Filed in Color)

(56) References Cited

U.S. PATENT DOCUMENTS

| | | | |
|---|---|---|---|
| 2016/0171726 A1* | 6/2016 | Nam | G06T 11/006 382/131 |
| 2019/0209006 A1* | 7/2019 | Abou Shousha | A61B 3/103 |
| 2022/0036575 A1* | 2/2022 | Shin | A61B 5/7267 |

FOREIGN PATENT DOCUMENTS

| | | |
|---|---|---|
| KR | 20160072004 A | 6/2016 |
| KR | 20200032651 A | 3/2020 |
| WO | 2020122606 A1 | 6/2020 |

OTHER PUBLICATIONS

Ozturk, T. et al., "Automated detection of COVID-19 cases using deep neural networks with x-ray images," Computers in Biology and Medicine, vol. 121, Jun. 2020, 11 pages.

Eckermann, M. et al., "3D virtual pathohistology of lung tissue from Covid-19 patients based on contrast X-ray tomography," eLife, vol. 9, No. 6408, Sep. 4, 2020, 25 pages.

ISA Korean Intellectual Property Office, International Search Report and Written Opinion Issued in Application No. PCT/US2022/070232, May 3, 2022, WIPO, 11 pages.

Eduardo Mortani Barbosa Jr et al.: "Automated detection and quantification of COVID-19 airspace disease on chest radiographs: A novel approach achieving radiologist-level performance using a CNN trained on digital reconstructed radiographs (DRRs) from CT-based ground-truth", Arxiv.org, Cornell University Library, 201 Olin Library Cornell University Ithaca, NY 14853, Aug. 13, 2020, XP081740700.

EP application 22764235.2 filed Sep. 6, 2023—extended Search Report issued 03JAN2025; 10 pages.

* cited by examiner

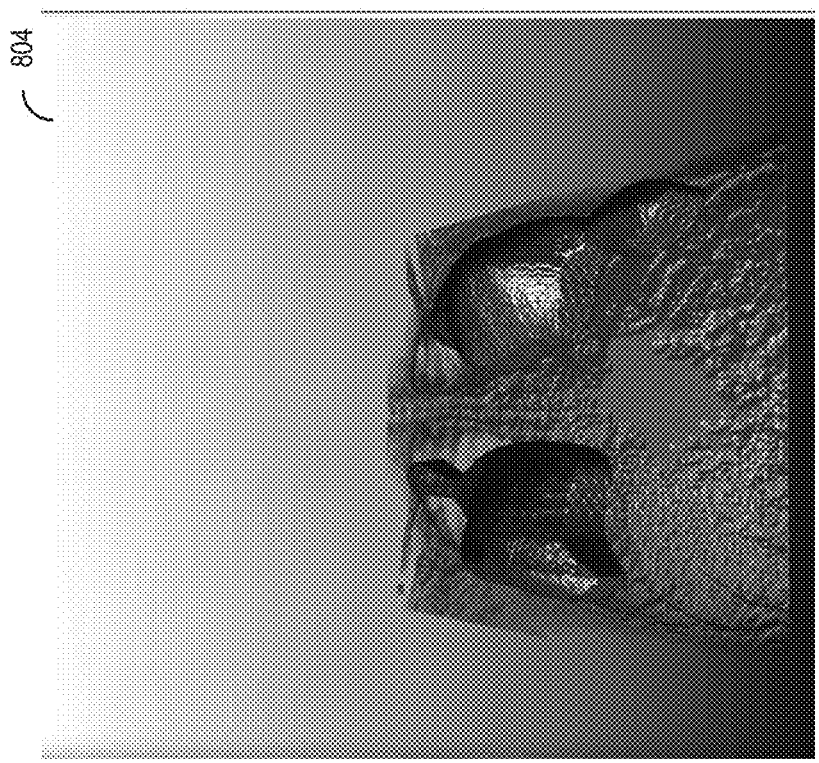
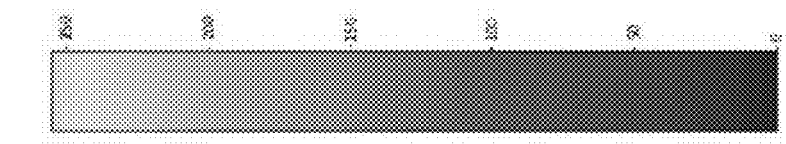
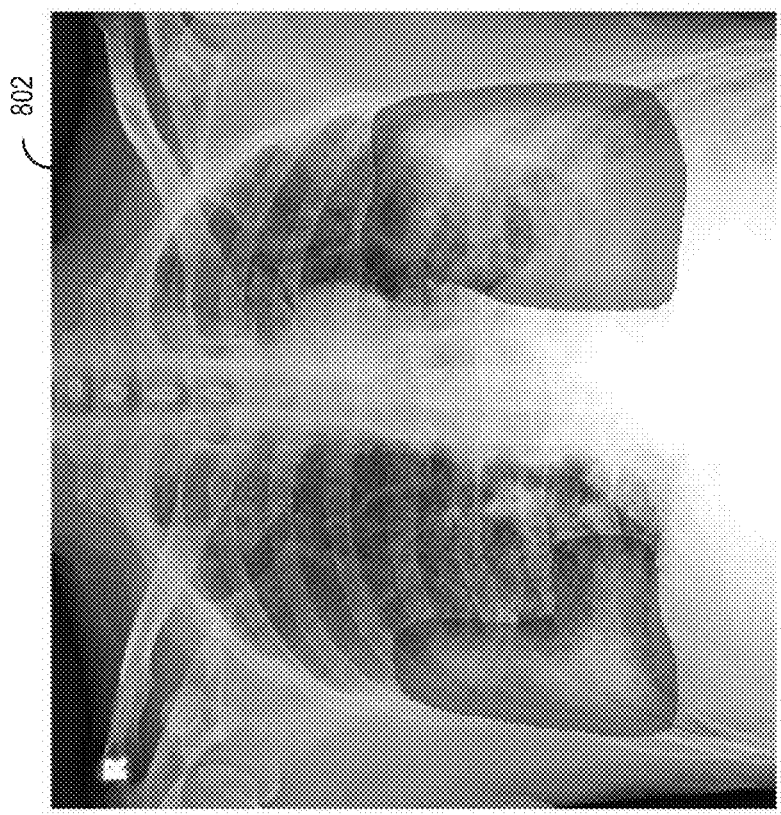
FIG. 8A
FIG. 8B

SYSTEM AND METHODS FOR INFERRING THICKNESS OF OBJECT CLASSES OF INTEREST IN TWO-DIMENSIONAL MEDICAL IMAGES USING DEEP NEURAL NETWORKS

CROSS REFERENCE TO RELATED APPLICATIONS

The present application is a divisional of U.S. Non-Provisional patent application Ser. No. 17/192,804, entitled "SYSTEM AND METHODS FOR INFERRING THICKNESS OF OBJECT CLASSES OF INTEREST IN TWO-DIMENSIONAL MEDICAL IMAGES USING DEEP NEURAL NETWORKS", and filed on Mar. 4, 2021. The entire contents of the above-listed application are hereby incorporated by reference for all purposes.

TECHNICAL FIELD

Embodiments of the subject matter disclosed herein relate to medical imaging, including x-ray and computed tomography (CT) imaging. In particular, the current disclosure provides systems and methods for inferring a three-dimensional (3D) depth or thickness of one or more materials of interest in a two-dimensional (2D) image.

BACKGROUND

Determining a volume of an object class of interest, such as a tissue type, an organ, or a disease affected region (e.g., a volume of inflamed tissue, necrotic tissue, tumor, etc.) may be useful in diagnosing or assessing a condition of a patient. As an example diagnosing a disease affecting lung tissue, such as pneumonia or severe acute respiratory syndrome coronavirus 2 (SARS-CoV-2, may be based on a volume of inflamed lung tissue compared to non-inflamed lung tissue. However, determining a volume of an object class of interest conventionally relies upon a three-dimensional (3D) imaging system, such as a computed tomography (CT) system, a magnetic resonance imaging (MRI) system, or a positron emission tomography (PET) system. Conventional 3D imaging systems are expensive, large/immobile, and generally require more highly trained technicians, compared to two-dimensional (2D) imaging modalities. Thus, 3D imaging systems may be less readily available than 2D imaging systems, e.g. 3D imaging systems may be of limited availability in rural regions or developing countries as compared to 2D imaging systems, and even in large hospitals there may be more 2D imaging systems available than 3D imaging systems. This reduced availability of 3D imaging systems may be exacerbated in situations where a large number of patients may benefit from volumetric assessment of an object class of interest, such as during a pandemic where a large number of patients may seek diagnosis/assessment via a volumetric analysis of an object class of interest. Thus, it is generally desirable to explore systems and methods for determining volumes of object classes of interest from 2D medical images.

SUMMARY

The inventors herein have developed systems and methods which may enable determination of volumetric information for at least a first object class of interest from 2D medical images, thereby extending functionality of 2D imaging modalities for use in diagnosing and assessing medical conditions. In one embodiment, the current disclosure provides a method comprising, acquiring a 2D medical image, extracting features from the 2D medical image, mapping the features to a segmentation mask for an object class of interest using a first convolutional neural network (CNN), mapping the features to a thickness mask for the object class of interest using a second CNN, wherein the thickness mask indicates a thickness of the object class of interest at each pixel of a plurality of pixels of the 2D medical image, and determining a volume of the object class of interest based on the thickness mask and the segmentation mask. In this way, depth/thickness information may be extracted from a 2D medical image by leveraging CNNs to produce a thickness mask for an object class of interest. The thickness mask may then be used to determine a volume for the object class of interest, which may facilitate patient evaluation/diagnosis.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawings will be provided by the Office upon request and payment of the necessary fee.

Various aspects of this disclosure may be better understood upon reading the following detailed description and upon reference to the drawings in which:

FIG. 8A shows an exemplary embodiment of a thickness heat-map which may be generated from a thickness mask for an object class of interest;

FIG. 8B shows an exemplary embodiment of a pseudo-3D image which may be generated from a thickness mask for an object class of interest;

Figure 1:
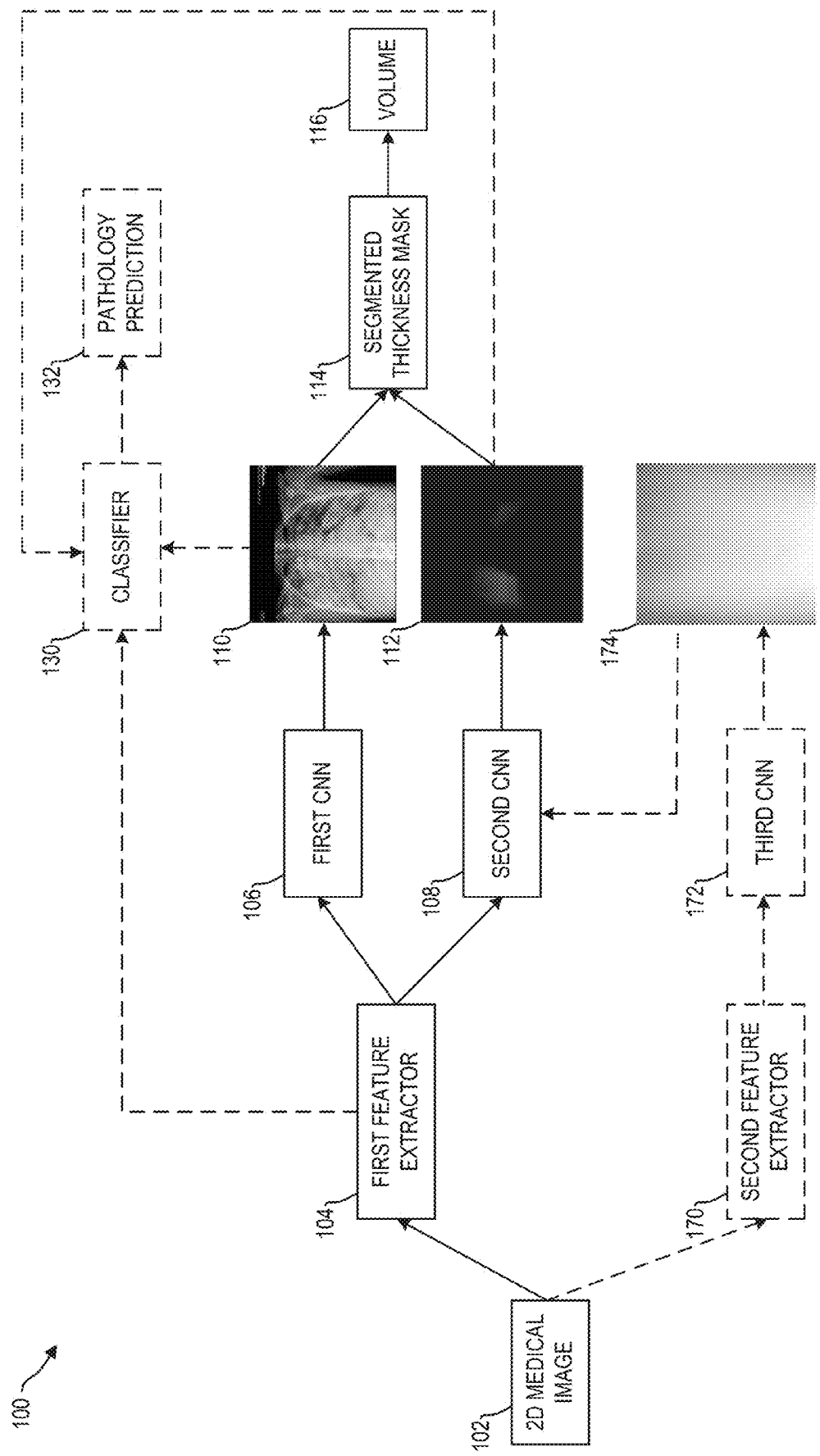
FIG. 1 is a block diagram of a system for determining volume of an object class of interest from a 2D medical image, according to an exemplary embodiment.

The drawings illustrate specific aspects of the described system and methods for inferring thickness of an object class of interest from 2D medical images using deep neural networks. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

The following description relates to inferring depth of one or more object classes of interest in 2D medical images using deep neural networks. The disclosure includes aspects directed to generating training data for the deep neural networks, training said deep neural networks, as well as implementing the deep neural networks to infer a thickness mask for one or more object classes of interest. The disclosure further includes systems and methods for determining a volume of the one or more object classes of interest and/or a pathology prediction based on the inferred thickness mask of the one or more object classes of interest.

Figure 5:
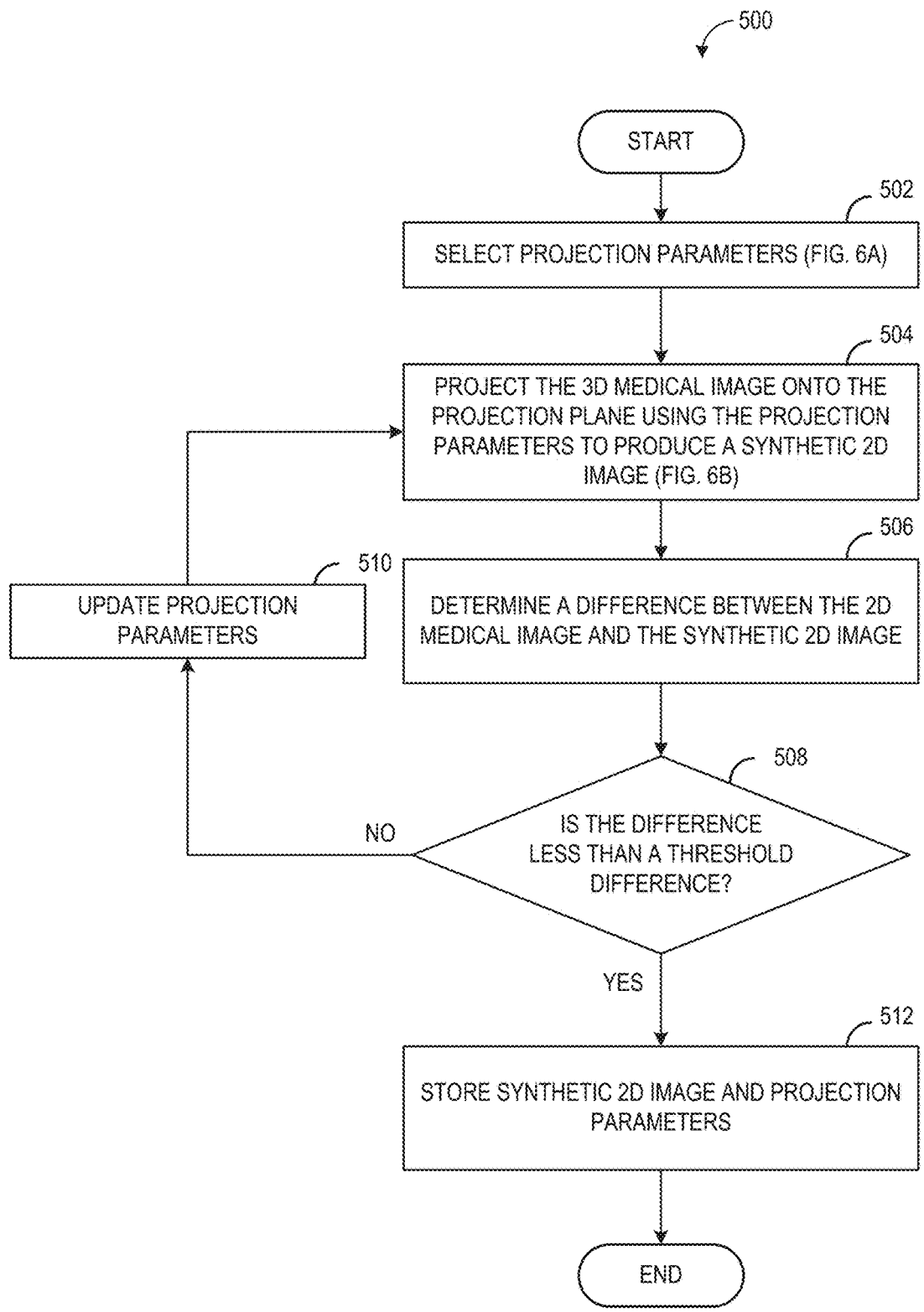
FIG. 5 is a flow chart illustrating a method for determining projection parameters for projecting a 3D image onto a 2D plane to produce a synthetic 2D image, based on a separately acquired and corresponding 2D medical image, according to an exemplary embodiment.
Figure 6B:
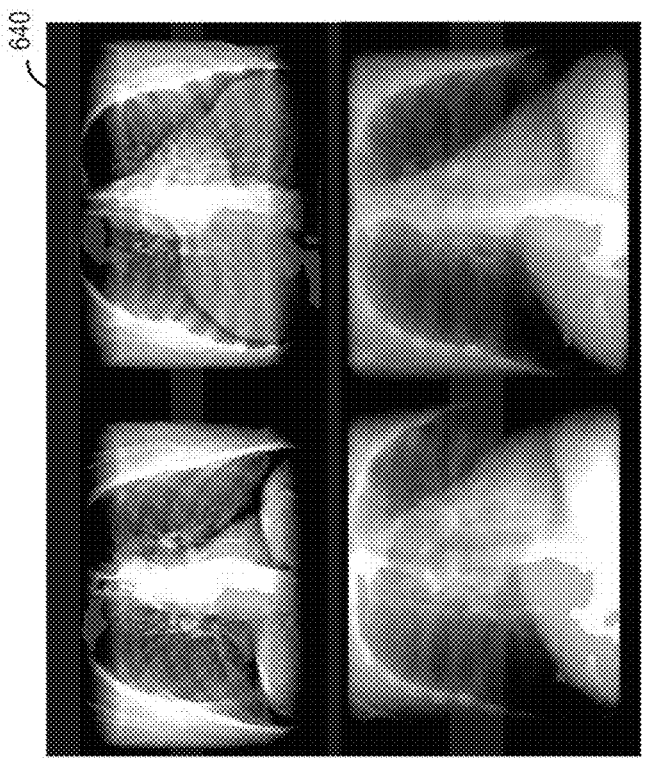
FIG. 6B illustrates exemplary synthetic 2D images generated according to the process shown in FIG. 6A.
Figure 6A:
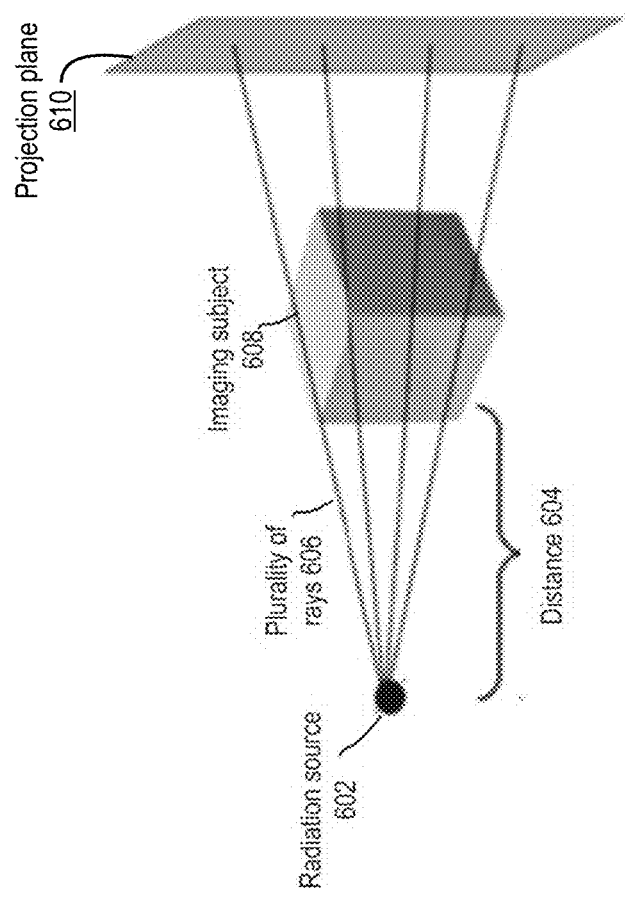
FIG. 6A illustrates a process of projecting a 3D image onto a 2D plane to produce a synthetic 2D image, according to an exemplary embodiment.

In one embodiment, a thickness prediction system, such as thickness prediction system 100 illustrated in FIG. 1, may determine one or more of a thickness mask and volume prediction for one or more object classes of interest in a 2D medical image using one or more trained convolutional neural networks (CNNs). The thickness prediction system 100 may be implemented by an imaging system, such as imaging system 200, shown in FIG. 2, to process acquired 2D images. Method 300, shown in FIG. 3, provides an exemplary embodiment of a method by which a 2D image, acquired by a 2D imaging system, such as imaging system 200, may be mapped to a thickness mask, and optionally used to determine a pathology prediction and/or volume of an object class of interest. Training data, comprising 2D images and corresponding ground truth thickness masks, may be used to train a deep neural network to infer thickness of an object class of interest, such as the first CNN 106 of thickness prediction system 100. Training data may be produced according to the exemplary method 400, shown in FIG. 4. Generation of training data, may in some embodiments include projecting an annotated three-dimensional (3D) image onto a 2D plane, to produce a synthetic 2D image. Method 500, shown in FIG. 5, illustrates an exemplary method for determining projection parameters, whereby a 3D image may be projected onto a 2D plane to produce a synthetic 2D image matching a previously acquired 2D medical image. Adjusting projection parameters until a difference between the 2D synthetic image and the 2D medical image is below a threshold, enables the same projection parameters to be applied to the 3D annotation of the 3D image to produce a ground truth thickness mask corresponding to the 2D medical image. FIG. 6A illustrates a process by which a 3D image may be projected onto a 2D plane, while FIG. 6B illustrates ground truth thickness masks (and synthetic 2D images) which may be generated according to the projection process illustrated by FIG. 6A. The training data pairs generated by method 400, may be employed in method 700, shown in FIG. 7, to train a deep neural network to infer a thickness mask from an input 2D medical image.

Figure 9:
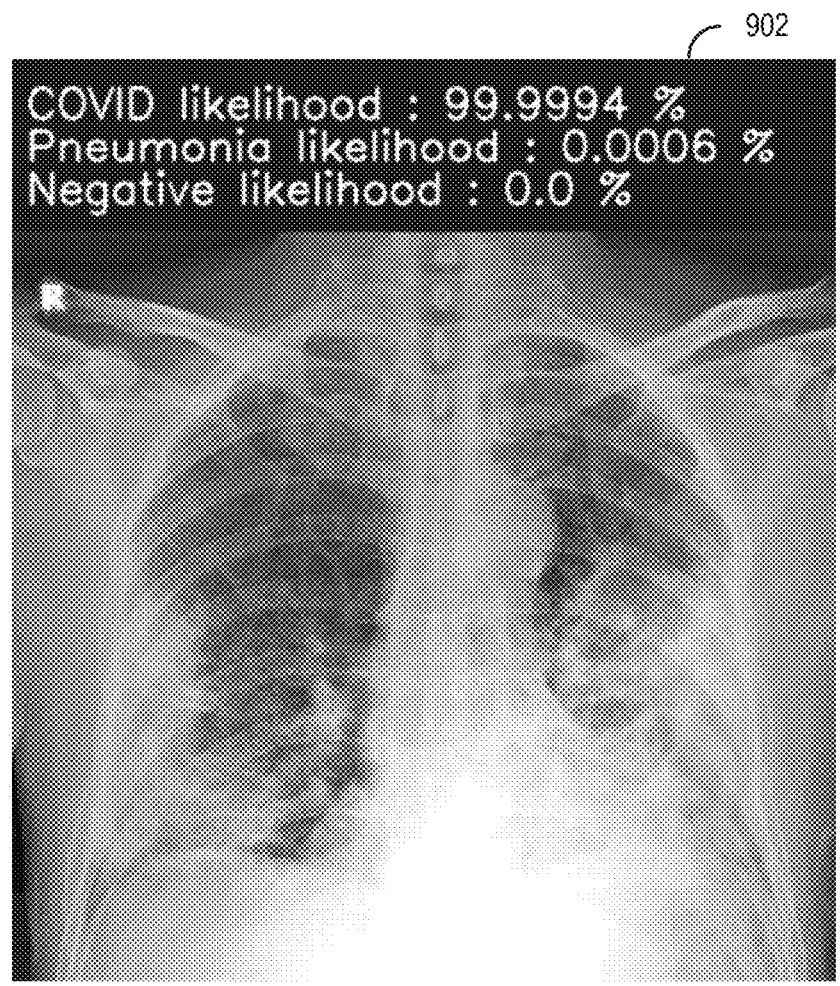
FIG. 9 shows a pathology prediction overlaid on a 2D medical image, wherein the pathology prediction may be based on an inferred volume of a disease region, according to an exemplary embodiment.
Figure 10:
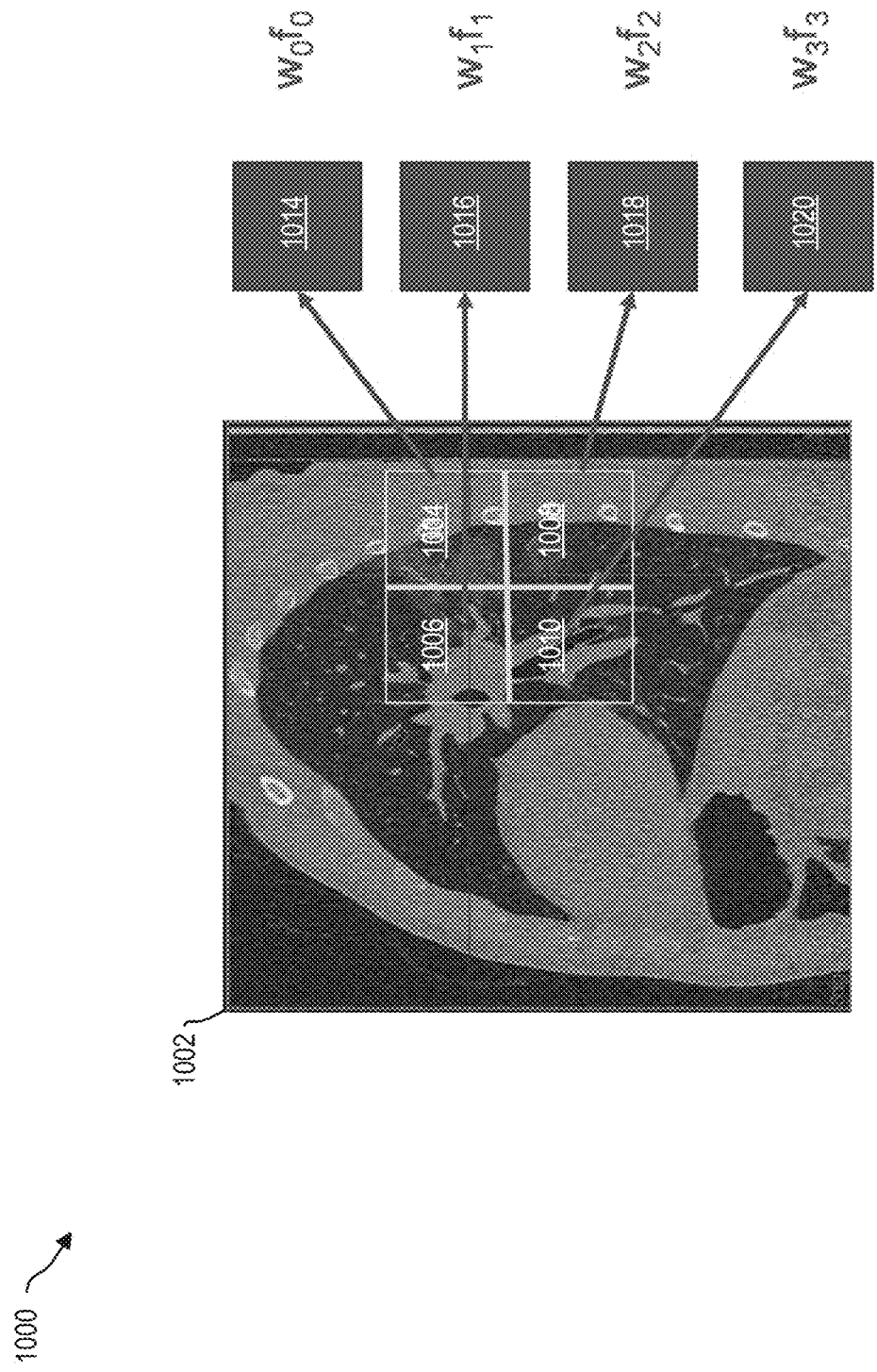
FIG. 10 shows an exemplary embodiment of a spatial regularization constraint which may be imposed on a deep neural network trained to infer thickness of an object class of interest based on a 2D medical image.
Figure 11:
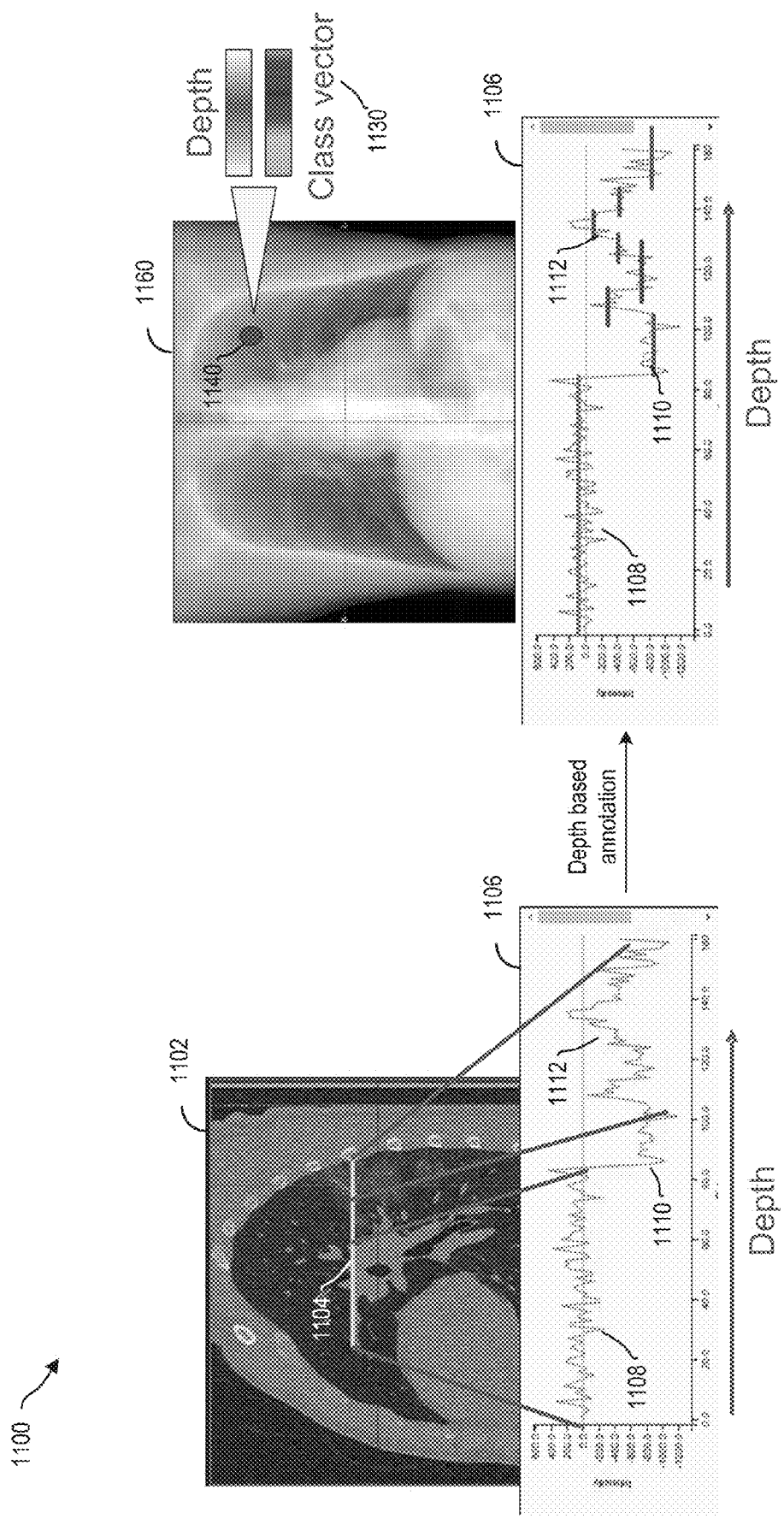
FIG. 11 illustrates generation of a depth information encoding vector, according to an exemplary embodiment.

The thickness mask may be used to produce a visual display of the thickness of the object class of interest, such as the thickness heat-map 802 shown in FIG. 8A or the pseudo-3D image 804 shown by FIG. 8B Likewise, the thickness mask may also be used to determine a pathology prediction, wherein an exemplary pathology prediction 902 is shown in FIG. 9. Further, the inventors herein determined application of a spatial regularization constraint to the filters of the CNNs may advantageously reduce noise and roughness in the generated thickness masks. An illustration of one exemplary regularization approach is shown in FIG. 10. FIG. 11 illustrates an exemplary process by which a depth information encoding vector may be produced from a 3D image (or cross sectional 2D image), to produce a ground truth thickness mask, wherein each point of the ground truth thickness mask includes a depth information encoding vector indicating a depth-wise density for an object class of interest or a depth-wise object class label for a plurality of object classes. Deep neural networks trained using depth information encoding vectors may infer, in addition to thickness, a depth dependent density and/or a depth dependent location of one or more object classes of interest.

As used herein, the term object class of interest may refer to one or more of a biological tissue, an organ, a disease affected region, a surgical implant, a tumor, a cavity or space within a biological imaging subject, a plaque or fatty buildup, and a biological fluid. As used herein, the terms thickness or depth (which may be used interchangeably), when used to describe an object class of interest in a 2D medical image, refer to an extent of said object class of interest in a direction perpendicular to a surface or plane of the 2D medical image. As an example, if a width of a 2D medical image runs parallel to an x-axis, and a height of the 2D medical image extends parallel to a y-axis, than the thickness or depth of an object imaged by the 2D medical image may be considered as running parallel to a z-axis extending into (and out of) a plane of the 2D medical image, wherein the x-axis, y-axis, and z-axis are each perpendicular to each other. The term area, when applied to the description of an object class of interest captured by a 2D image, herein refers to an area of a plane of the 2D medical image occupied by the object class of interest. Put another way, in a 2D medical image comprising a plurality of pixels, the area of an object class of interest may refer to a number of pixels of the plurality of pixels depicting said object class of interest. The area of an imaged object class of interest may be converted into physical units, such as $cm^2$, by multiplying by a conversion factor for a particular image. Similarly, the term volume, when used herein to describe an object class of interest, refers to a three-dimensional (3D) volume occupied by the object class of interest in 3D space. In one example, the volume of an object class of interest captured by a 3D image may be proportional to the number of voxels of the 3D image occupied by the object class of interest.

Physical units for a volume of an object class of interest, such as $cm^3$, may be determined by multiplying a number of voxels occupied by the object class of interest by a conversion factor. Alternatively, physical units for a volume of an object class of interest captured in a 3D image may be determined by multiplying a fraction of the total 3D image occupied by the object class of interest by a total physical volume of the 3D image.

Turning to FIG. 1, an exemplary embodiment of a thickness prediction system 100 is shown. Thickness prediction system 100 is configured to determine a thickness mask and volume for an object class of interest in a 2D medical image, and optionally a pathology prediction for the 2D medical image. Thickness prediction system 100 may be implemented by an image processing system, such as image processing device 202 of imaging system 200 shown in FIG. 2. Thickness prediction system 100 includes a first feature extractor 104, configured to extract features from an input 2D medical image 102. A first CNN 106 is configured to receive the features extracted from the 2D medical image 102 and segment one or more object classes of interest to produce a segmentation mask 110. Similarly, a second CNN 108 is configured to map the features extracted from the 2D medical image 102 to a thickness mask 112, indicating thickness of at least the first object class of interest at each point/pixel of the 2D medical image 102. The segmentation mask 110 and thickness mask 112 may be used to produce a segmented thickness mask 114, from which a volume 116 for at least the first object class of interest may be determined. Optionally, a pathology prediction 132 may be determined by classifier 130, based on the features extracted by feature extractor 104, in addition to the segmentation mask 110 and the thickness mask 112. Further, an optional second thickness mask 174 may be produced by a second feature extractor 170 and a third CNN 172, wherein the second thickness mask 174 may be fed to second CNN 108 as input, in addition to the features extracted by first feature extractor 104.

The thickness prediction system 100 may receive 2D medical image 102 from one or more external devices, such as an image repository, or an imaging device. 2D medical image 102 may comprise a 2D medical image acquired by substantially any 2D imaging modality known in the art of medical imaging, including but not limited to x-ray imaging, MRI, CT imaging, PET imaging, ultrasound imaging, optical imaging, etc. In some embodiments, 2D medical image 102 comprises a matrix of intensity values, in one or more color channels, wherein each intensity value of each of the one or more color channels uniquely corresponds to an intensity value for an associated pixel. The 2D medical image 102 may include an image of an anatomical region of an imaging subject. In the example shown by FIG. 1, the 2D medical image 102 is a chest x-ray of a patient.

The 2D medical image 102 is fed to a first feature extractor 104. First feature extractor 104 is configured to extract features from the 2D medical image 102 to produce a feature map. Features may include pixel intensity values, patterns of pixel intensity values, or patterns of previously extracted features. In some embodiments, a feature map indicates for each of a plurality of sub regions of the 2D medical image 102 a degree of match between the sub region and a filter, wherein a relative position of each of the plurality of sub regions of the 2D medical image 102 is maintained in the relative position of the features in the feature map. In some embodiments, the first feature extractor 104 is a deep neural network configured to map the matrix of pixel intensity values of the 2D medical image 102 to a feature map using one or more convolutional layers, fully connected layers, activation functions, regularization layers, and dropout layers. In some embodiments, first feature extractor 104 may not comprise learnable parameters, but may comprise an expert system configured to extract one or more pre-determined features from 2D medical image 102 based on hard coded domain knowledge.

The features of 2D medical image 102 extracted by the first feature extractor 104 are fed to first CNN 106. First CNN 106 comprises one or more convolutional layers, wherein each of the one or more convolutional layers includes one or more filters, comprising a plurality of learnable weights, with a pre-determined receptive field and stride. First CNN 106 may receive the features extracted by first feature extractor 104 as a feature map, wherein a spatial relationship of each of the extracted features are retained within the feature map and encoded in a relative position of each feature within the feature map. First CNN 106 is configured to map the features of the 2D medical image 102 to a segmentation mask for at least a first object class of interest. In one embodiment, segmentation mask 110 comprises a plurality or matrix of values, corresponding to the plurality of pixel intensity values of the 2D medical image 102, wherein each value of the segmentation mask 110 indicates a classification of a corresponding pixel of the 2D medical image 102. In some embodiments, segmentation mask 110 may be a binary segmentation mask, comprising a matrix of 1's and 0's, wherein a 1 indicates a pixel belongs to an object class of interest, and a 0 indicates a pixel does not belong to the object class of interest. In some embodiments, segmentation mask 110 may comprise a multi-class segmentation mask, comprising a matrix of N distinct integers (e.g., 0, 1 . . . N), wherein each distinct integer corresponds uniquely to an object class, thus enabling the multi-class segmentation mask to encode position and area information for a plurality of object classes of interest. The values of the segmentation mask 110 spatially correspond to the pixels/intensity values of the 2D medical image, such that if the segmentation mask 110 was overlaid onto the 2D medical image 102, each value of the segmentation mask would align with (that is, be overlaid upon) a corresponding pixel of the 2D medical image 102, which an object classification for each pixel of the 2D medical image would be indicated by the corresponding value of the segmentation mask.

The features of 2D medical image 102 extracted by the first feature extractor 104 are also fed to second CNN 108. Second CNN 108 comprises one or more convolutional layers, wherein each of the one or more convolutional layers includes one or more filters, comprising a plurality of learnable weights, with a pre-determined receptive field size and stride. Second CNN 108 may receive the features extracted by first feature extractor 104 as a feature map, wherein a spatial relationship of each of the extracted features are retained within the feature map and encoded in a relative position of each feature within the feature map. Second CNN 108 is configured to map the features of the 2D medical image 102 to thickness mask for at least a first object class of interest. Thickness mask 112, output by second CNN 108, may comprise a matrix of thickness values for at least a first object class of interest, wherein each value of the matrix of thickness values indicates a thickness of at least the first object class of interest at a corresponding pixel/position of the 2D medical image 102.

Segmentation mask 110 may be applied to thickness mask 112, to suppress thickness values corresponding to non-object class of interest regions, thereby producing a segmented thickness mask 114. In some embodiments, segmented thickness mask 114 may be produced by performing pair-wise multiplication between the plurality of values of segmentation mask 110 and the plurality of thickness values of thickness mask 112, wherein each value of the segmented thickness mask 114 is the product of a multiplication between a spatially corresponding value of the segmentation mask 110 and a spatially corresponding thickness value of thickness mask 112. By applying the segmentation mask 110 to the thickness mask 112 to suppress thickness values not classified as belonging to the object class of interest, a more accurate volume may be determined for the object class of interest.

As first CNN 106, and second CNN 108 both receive the features extracted by feature extractor 104, the first CNN 106 may be referred to as a first CNN branch and the second CNN 108 may be referred to as a second CNN branch, wherein the feature extractor 104, the first CNN 106 and the second CNN 108, may compose a single deep neural network. In some embodiments, each of the feature extractor 104, the first CNN 106, and the second CNN 108, may be trained during a single training process, wherein a first loss may be determined based on output of the first CNN 106 and a second loss may be determined based on output of the second CNN 108, wherein the first loss is used to update parameters of the first CNN 106, the second loss is used to update parameters of the second CNN 108, and both the first loss and the second loss are used to update parameters of the feature extractor 104. In some embodiments, the feature extractor 104, the first CNN 106, and the second CNN 108 may each be trained separately.

Thickness prediction system 100 may determine a volume for at least the first object class of interest based on the segmented thickness mask 114. In some embodiments, each thickness value of the segmented thickness mask may be summed to produce a thickness total, and the thickness total may then be multiplied by a conversion factor to produce a volume for the object class of interest. In some embodiments, the thickness values of the segmented thickness mask 114 may be considered as points in 3D space, wherein the z-coordinate of the point in 3D space is given by the thickness value, and the x and y coordinates of each point in 3D space corresponds to the row and column, respectively, of a corresponding pixel in the 2D medical image. The volume of the object class of interest may then be obtained as the integral, or an approximation of the integral, of the 3D surface formed by the plurality of points in 3D space.

Thickness prediction system 100 may optionally include a second feature extractor 170, and a third CNN 172, configured to determine a second thickness mask 174 from 2D medical image 102. When present, the second thickness mask 174 may be concatenated, pooled, or otherwise combined with the feature map produced by first feature extractor 104, and the combined feature map and second thickness mask 174 may be fed to the second CNN and mapped to the first thickness mask for the first object class of interest. In some embodiments, the second thickness mask indicates thickness of a second object class of interest, distinct from the first object class of interest indicated by first thickness mask 112. In some embodiments, the first object class of interest is a disease affected region and the second object class of interest is a thickness of a non-disease affected region. In some embodiments, the first object class of interest is a first tissue type, and the second object class of interest is a second tissue type. In some embodiments, the second object class of interest is a total object depth (e.g., a total depth of object tissue at each pixel of 2D medical image 102). By first determining a second thickness mask 174, and using this thickness mask as input into the second CNN 108 to determine the first thickness mask, the inventors herein have discovered that an accuracy of the thickness values of the first thickness mask may be increased.

Second feature extractor 170 may receive as input 2D medical image 102, and extract features from the 2D medical image 102 to a feature map. In some embodiments, the second feature extractor 170 is a deep neural network configured to map the matrix of pixel intensity values of 2D image 102 to a feature map using one or more convolutional layers, fully connected layers, activation functions, regularization layers, and dropout layers. In some embodiments, second feature extractor 170 may not comprise learnable parameters, but may comprise an expert system configured to extract one or more pre-determined features from 2D medical image 102 based on hard coded domain knowledge.

The features of 2D medical image 102 extracted by the second feature extractor 170 are fed to third CNN 172. Third CNN 172 comprises one or more convolutional layers, wherein each of the one or more convolutional layers includes one or more filters, comprising a plurality of learnable weights, with a pre-determined receptive field size and stride. Third CNN 172 may receive the features extracted by second feature extractor 170 as a feature map, wherein a spatial relationship of each of the extracted features are retained within the feature map and encoded in a relative position of each feature within the feature map. Third CNN 172 is configured to map the features of the 2D medical image 102 to a second thickness mask 174 for at least a second object class of interest. Second thickness mask 174, output by third CNN 172, may comprise a matrix of thickness values for at least the second object class of interest, wherein each value of the matrix of thickness values indicates a thickness of at least the second object class of interest at a corresponding pixel/position of the 2D medical image 102. As stated above, the second thickness mask 174 is then fed as input, along with features extracted by first feature extractor 104, into second CNN 108.

Further, thickness prediction system 100 may optionally include classifier 130, configured to receive as input a feature map produced by first feature extractor 104, the segmentation mask 110, and thickness mask 112, and map these inputs to pathology prediction 132. In some embodiments, classifier 130 comprises one or more fully connected neural network layers, and may therefore be referred to as a fully connected neural network. Pathology prediction 132 is a probability for one or more pathologies. One example of a pathology prediction is shown by pathology prediction 902 in FIG. 9. In some embodiments, classifier 130 comprises a pre-trained deep neural network, trained to map a segmentation map and thickness map for at least a first object class of interest to a pathology prediction. The inventors herein have determined that prediction of certain pathologies, such as pneumonia, SARS-CoV-19, etc., may benefit from an accurate estimation of a volume of disease affected region. In some embodiments, the object class of interest may be a disease affected region, in such embodiments the thickness mask 112 and the segmentation mask 110 implicitly contain information regarding a volume of the disease affected region, and by inputting this information directly into classifier 130, a more accurate pathology prediction may be determined. In the above example of pneumonia and SARS-CoV-19, a disease affected region may comprise inflamed lung tissue and/or accumulated fluid in the lungs.

Figure 2:
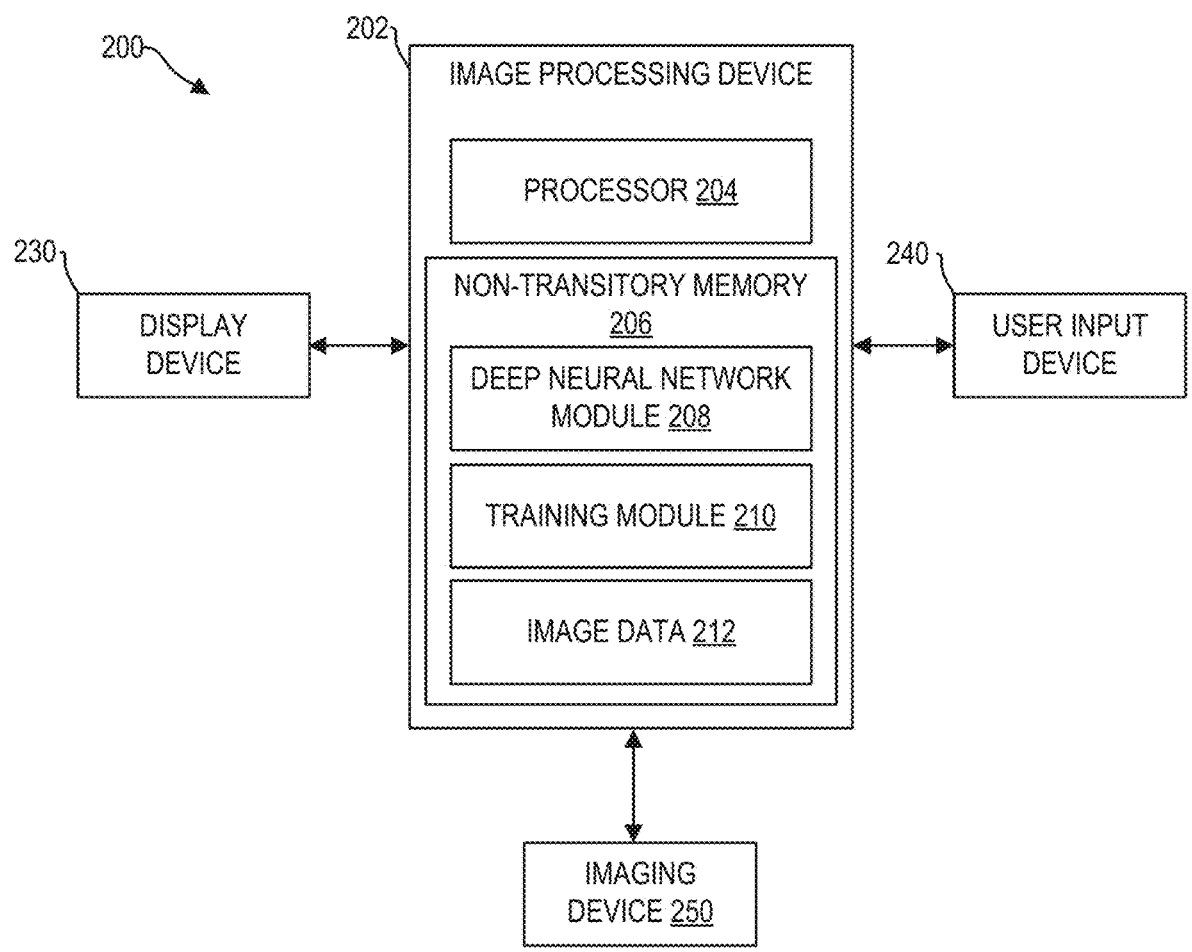
FIG. 2 is a block diagram of an exemplary embodiment of a medical imaging system.
Figure 3:
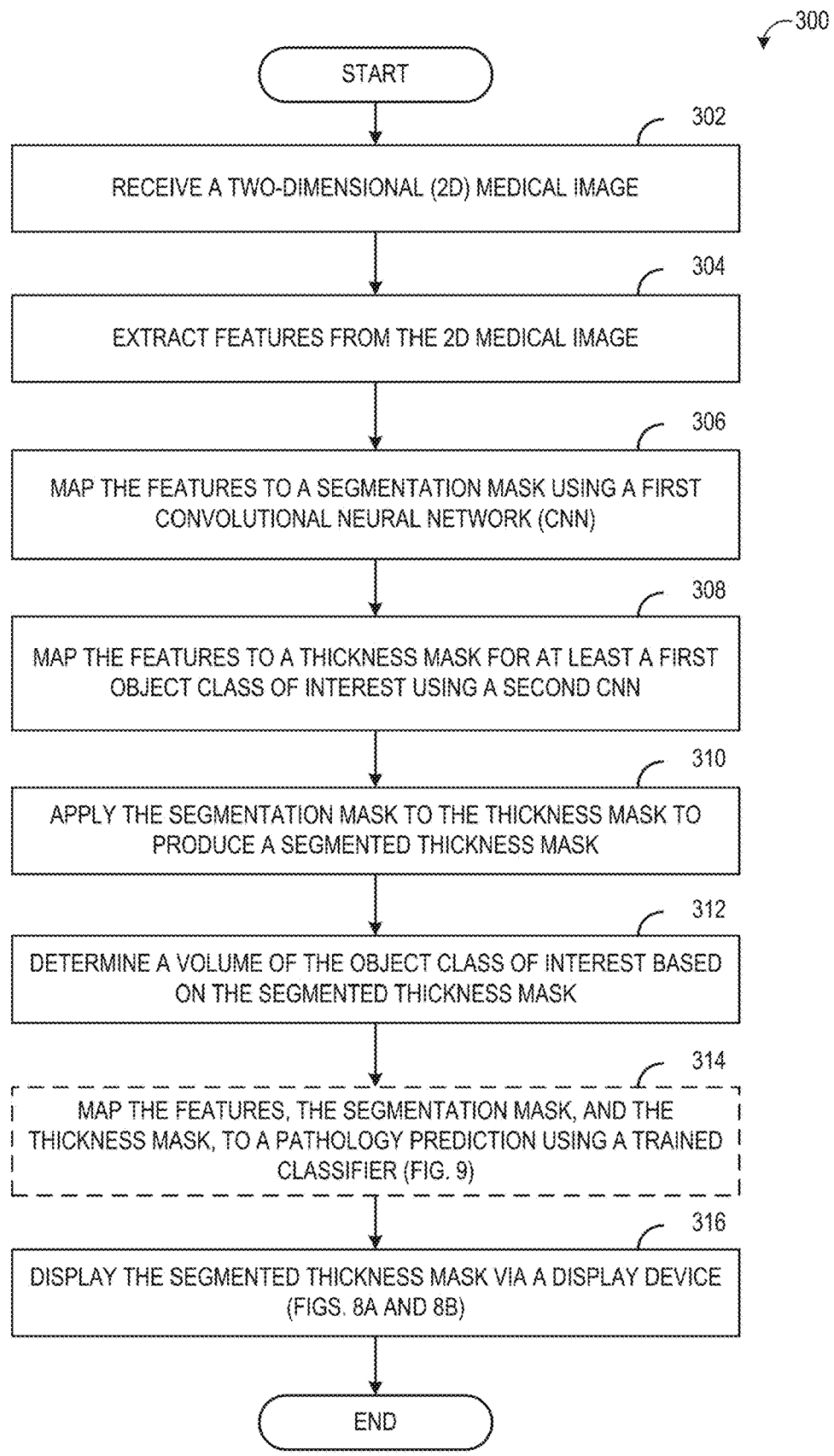
FIG. 3 is a flow chart illustrating a method for determining a thickness mask for at least a first object class of interest, according to an exemplary embodiment.

Referring to FIG. 2, an imaging system 200 is shown, in accordance with an exemplary embodiment. In some embodiments, at least a portion of imaging system 200 is disposed at a remote device (e.g., edge device, server, etc.) communicably coupled to imaging system 200 via wired and/or wireless connections. In some embodiments, at least a portion of imaging system 200 is disposed at a separate device (e.g., a workstation) which can receive images from the imaging system 200 or from a storage device which stores the images generated by one or more additional imaging systems. Imaging system 200 comprises image processing device 202, display device 230, user input device 240, and imaging device 250.

Image processing device 202 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may store deep neural network module 208, training module 210, and image data 212. Deep neural network module 208 may include one or more deep neural networks, comprising a plurality of weights and biases, activation functions, and instructions for implementing the one or more deep neural networks to receive 2D medical images and map the 2D medical images to one or more of a thickness mask or a segmentation mask. For example, deep neural network module 208 may store instructions for implementing a neural network, such as the first feature extractor 104, the second feature extractor 170, the first CNN 106, the second CNN 108, the third CNN 172, and/or the classifier 130, of thickness prediction system 100. Deep neural network module 208 may include trained and/or untrained neural networks and may further include various metadata for the one or more trained or untrained deep neural networks stored therein.

Non-transitory memory 206 may further include training module 210, which comprises instructions for training one or more of the deep neural networks stored in deep neural network module 208. Training module 210 may include instructions that, when executed by processor 204, cause image processing device 202 to conduct one or more of the steps of method 700, discussed in more detail below with reference to FIG. 7. In one example, training module 210 includes instructions for receiving training data pairs from image data 212, wherein said training data pair comprises a 2D medical image and corresponding ground truth thickness mask for use in training one or more of the deep neural networks stored in deep neural network module 208. In another example, training module 210 may include instructions for generating a training data by executing one or more of the operations of method 400, discussed in more detail below. In some embodiments, the training module 210 is not disposed at the imaging device 200, but is located remotely and communicatively coupled to imaging system 200.

Non-transitory memory 206 may further store image data 212. Image data 212 may include medical images, such as 2D or 3D images of anatomical regions of one or more imaging subjects. In some embodiments, the images stored in image data 212 may have been acquired by imaging device 250. In some embodiments, the images stored in imaging data 212 may have been acquired by remotely located imaging systems, communicatively coupled to imaging system 200. Images stored in imaging data 212 may include metadata pertaining to the images stored therein. In some embodiments, metadata for medical images stored in imaging data 212 may indicate one or more of image acquisition parameters used to acquire an image, a conversion factor for converting pixel/voxel to physical size (e.g., converting a pixel or voxel to an area, length, or volume corresponding to an area length or volume represented by said pixel/voxel), a date of image acquisition, an anatomical region of interest included in the image, etc.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

Imaging system 200 may further include user input device 240. User input device 240 may comprise one or more of a touchscreen, a keyboard, a mouse, a trackpad, a motion sensing camera, or other device configured to enable a user to interact with and manipulate data within image processing device 202. In one example, user input device 240 may enable a user to annotate an object class of interest in a 3D medical image.

Display device 230 may include one or more display devices utilizing virtually any type of technology. Display device 230 may be combined with processor 204, non-transitory memory 206, and/or user input device 240 in a shared enclosure, or may be peripheral display device and may comprise a monitor, touchscreen, projector, or other display device known in the art, which may enable a user to view 2D medical images, 3D medical images, pseudo-3D medical images, and thickness heat-maps, and/or interact with various data stored in non-transitory memory 206.

Imaging system 200 further includes imaging device 250. Imaging device 250 may comprise a 2D or 3D medical imaging device, including but not limited to an x-ray imaging device, a CT imaging device, an MRI system, an ultrasound, and a PET imaging device. Images acquired by imaging device 250 may be stored at image data 212 in non-transitory memory 206, or may be stored remotely at an external storage device communicatively coupled to imaging system 200.

It should be understood that image processing system 200 shown in FIG. 2 is for illustration, not for limitation. Another appropriate image processing system may include more, fewer, or different components.

It will be appreciated that distinct systems may be used during a training phase and an implementation phase of one or more of the deep neural networks described herein. In some embodiments, a first system may be used to train a deep neural network by executing one or more steps of a training method, such as method 700 described below, and a second separate system may be used to implement the deep neural network to infer thickness masks for 2D medical images, such as by executing one or more of the steps of method 300, described below. Further, in some embodiments, training data generation may be performed by a third system, distinct from the first system and the second system, by executing one or more steps of methods 400 and/or 500, described below. As such, the first system, the second system, and the third system, may each comprise distinct components. In some embodiments, the second system may not include a training module, such as training module 210, as deep neural networks stored on non-transitory memory of the second system may be pre-trained by the first system. In some embodiments, the first system may not include an imaging device, and may receive images acquired by external systems communicably coupled thereto. In some embodiments, the second system may not include or be communicably coupled to a 3D imaging device, and instead may infer 3D information, such as depth/thickness of one or more object classes of interest, from 2D medical images, using one or more trained deep neural networks. However, in some embodiments a single system may conduct one or more or each of training data generation, deep neural network training, and implementation of the trained deep neural networks, disclosed herein.

Referring to FIG. 3, a flow chart of a method 300 for inferring a thickness mask and a volume for at least a first object class of interest in a 2D medical image is shown. In some embodiments, method 300 may be implemented by an imaging system, such as imaging system 200, shown in FIG. 2. In some embodiments, the system executing method 300 may not include or be communicably coupled to a 3D imaging device, and may therefore perform one or more of the steps of method 300 to infer depth/thickness information, such as may be acquired from a 3D imaging system, from 2D medical images.

At operation 302, the imaging system receives a 2D medical image of an anatomical region of an imaging subject. The 2D medical image may comprise, but is not limited to 2D x-ray images, mammograms, or other 2D images. The 2D medical image received at operation 302 may comprise a plurality of intensity values in one or more color channels, corresponding to a plurality of pixels. The plurality of intensity values may be arranged in a definite order. In some embodiments, the plurality of intensity values of the 2D medical image may comprise a 2D array or matrix, wherein each intensity value of the plurality of intensity values in a particular color channel may be uniquely identified by a first index and a second index, such as by a row number and a column number. In embodiments where the 2D medical image includes a plurality of color channels, the color channel to which an intensity value corresponds may be further indicated by a third index. The 2D image may comprise a grayscale image or color image. In some embodiments, at operation 302 the imaging system acquires the 2D medical image using an imaging device, such as imaging device 250. In some embodiments, the imaging system receives the 2D medical image from an external device communicatively coupled to the imaging system, such as an image repository.

At operation 304, the imaging system extracts features from the 2D medical image to produce a feature map. In some embodiments, operation 304 includes the imaging system passing the 2D medical image into an input layer of a feature extractor, wherein the feature extractor may apply one or more filters to the 2D medical image to extract one or more features matching said one or more filters. In some embodiments, the filters may comprise learned filters of a convolutional layer. In some embodiments the filters may be hard-coded based on domain knowledge. In some embodiments the feature extractor may include both learned and hard-coded filters/parameters. In some embodiments, the feature extractor comprises a deep neural network, such as an encoder, wherein an input image is mapped into a compressed or encoded representation by passing through one or more layers of learned weights/filters. In some embodiments, the feature extractor may output a feature map, wherein a feature map comprises a spatially meaningful arrangement of identified/extracted features present in the 2D medical image. In some embodiments, operation 302 may further include the feature extractor concatenating with the feature map one or more pieces of metadata pertaining to the 2D medical image. As an example, one or more pieces of information pertaining to a 2D medical image may be included in a DICOM header, and this information may be vectorized and concatenated with a feature map output by the feature extractor. Alternatively, the feature extractor may be configured to receive metadata pertaining to the 2D medical image, in addition to the pixel intensity data of the 2D medical image, and map the metadata and pixel intensity data to a feature map.

At operation 306, the imaging system maps the features to a segmentation mask using a first CNN. The First CNN comprises one or more convolutional layers, wherein each of the one or more convolutional layers includes one or more filters, comprising a plurality of learned weights, with a pre-determined receptive field size and stride. The first CNN is configured to map the features of the 2D medical image to a segmentation mask for at least a first object class of interest. In one embodiment, the segmentation mask comprises a plurality or matrix of values, corresponding to the plurality of pixels of the 2D medical image, wherein each value of the segmentation mask indicates a classification of a corresponding pixel of the 2D medical image. In some embodiments, the segmentation mask may be a binary segmentation mask, comprising a matrix of 1's and 0's, wherein a 1 indicates a corresponding pixel belongs to an object class of interest, and a 0 indicates the corresponding pixel does not belong to the object class of interest. A binary segmentation mask may be applied to a same-sized matrix, such as the matrix of pixel intensity values comprising the 2D medical image, by multiplying each pixel intensity value by a corresponding mask value (this process may also herein be referred to as pixel-wise multiplication or pair-wise multiplication). The effect of pixel-wise multiplication between the 2D medical image and the binary segmentation mask is suppression of pixel intensity values not classified by the first CNN as belonging to the first object class of interest.

At operation 308, the imaging system maps the features to a thickness mask for at least the first object class of interest. The second CNN comprises one or more convolutional layers, wherein each of the one or more convolutional layers includes one or more filters, comprising a plurality of learnable weights, with a pre-determined receptive field size and stride. The second CNN may receive the features extracted by the feature extractor as a feature map, wherein a spatial relationship of each of the extracted features are retained within the feature map and encoded in a relative position of each feature within the feature map. The second CNN is configured to map the features of the 2D medical image acquired at operation 302 to a thickness mask for at least the first object class of interest. The thickness mask may comprise a matrix of thickness values for at least the first object class of interest, wherein each value of the matrix of thickness values indicates a thickness of at least the first object class of interest at a corresponding pixel/position of the 2D medical image. In some embodiments, the thickness mask output by the second CNN may comprise a plurality of depth information encoding vectors, indicating a depth dependent position and/or density for at least the first object class of interest.

At operation 310, the imaging system applies the segmentation mask produced at operation 306 to the thickness mask produced at operation 308, to produce a segmented thickness mask. Application of the segmentation mask to the thickness mask suppresses thickness values corresponding to non-object class of interest regions, as said thickness values are associated with segmentation values of 0, thus upon pair-wise multiplication between the segmentation values and corresponding thickness values, said thickness value will be cancelled (that is, will become zero). In this way, the imaging system reduces noise in the thickness mask, and enables more accurate volume determination for the object class of interest.

At operation 312, the imaging system determines a volume for the object class of interest based on the segmented thickness mask. In some embodiments, each thickness value of the segmented thickness mask may be summed to produce a thickness total, and the thickness total may then be multiplied by a conversion factor to produce a volume for the object class of interest. In some embodiments, the conversion factor may be included as metadata associated with the 2D medical image. In some embodiments, the thickness values of the segmented thickness mask may be plotted as points in 3D space, wherein the z-coordinate of the point in 3D space is given by the thickness value, and the x and y coordinates of each point in 3D space corresponds to the row and column, respectively, of a corresponding pixel in the 2D medical image. The volume of the object class of interest may then be obtained as the integral, or an approximation of the integral, of the 3D surface formed by the plurality of points in 3D space.

At operation 314, the imaging system may optionally feed the features extracted by the feature extractor at operation 304, the segmentation mask produced at operation 306, and the thickness mask produced at operation 308, to a trained classifier. The trained classifier may then determine a pathology prediction, indicating a probability score for one or more diseases. In one embodiment, the trained classifier comprises a fully connected neural network, comprising one or more fully connected layers. An output layer of the trained classifier may include one or more regression nodes, wherein each of the one or more regression nodes corresponds to a distinct pathology, and the output of said regression node is a predicted probability of a pathology. An example of a pathology prediction is shown in FIG. 9, by pathology prediction 902. Turning briefly to FIG. 9, it can be seen that the pathology prediction 902 includes a probability score for a plurality of pathologies, as well as a separate probability score for a non-pathology state. The pathology prediction 902 further includes an associated 2D medical image, for which the pathology prediction 902 was generated. In the particular case of pathology prediction 902, it can be seen that a probability of 99.9994% has been determined for COVID (SARS-CoV-19), a probability of 0.0006% has been determined for pneumonia, and a probability of 0.0% has been determined for a non-disease state. Each of the three probabilities of pathology prediction 902 may be produced by a separate regression node of an output layer of the trained classifier. The pathology prediction determined at operation 314 may be displayed to a user via a display device communicatively coupled to the imaging system.

At operation 316, the imaging system displays the segmented thickness mask to a user via a display device. In some embodiments, the imaging system may generate a thickness heat-map from the segmented thickness mask, overlay the thickness heat-map onto the 2D medical image, and display the thickness heat-map overlaid upon the 2D medical image, as shown by an exemplary embodiment thickness heat-map 802 shown in FIG. 8A. In some embodiments, the imaging system may generate a pseudo-3D image from the segmented thickness mask, wherein the thickness value for each pixel of the 2D medical image is plotted as a z-coordinate in 3D space, wherein the x-coordinate and y-coordinate of each point plotted in 3D space corresponds to the position of an associated pixel in the 2D medical image. An exemplary embodiment of a pseudo-3D image generated from a segmented thickness mask is shown by pseudo-3D image 804, shown in FIG. 8B.

In this way, method 300 enables depth/thickness information to be inferred from a 2D medical image for at least a first object class of interest, providing greater insight to patients and clinicians. In addition, by inferring depth information for an object class of interest, volume of the object class of interest may be estimated, which may facilitate diagnosis or evaluation of a patient.

Figure 4:
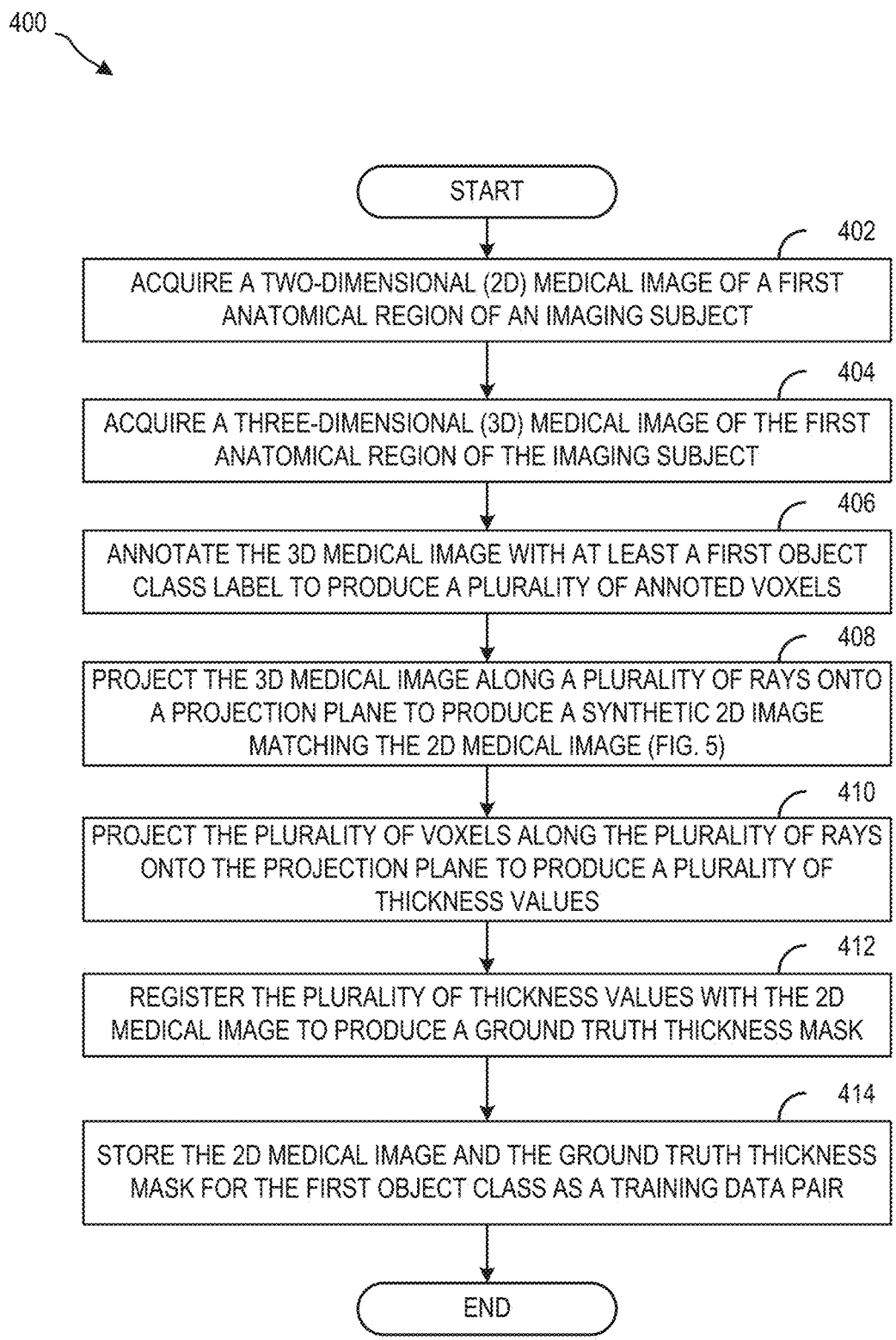
FIG. 4 is a flow chart illustrating a method for generating training data which may be used to train a deep neural network to map a 2D medical image to a thickness mask for one or more object classes of interest, according to an exemplary embodiment.

Turning to FIG. 4, method 400 for generating training data pairs for training a deep neural network to map 2D medical images to a corresponding thickness mask for at least a first object class of interest, is shown. Method 400 may be executed by one or more of the systems disclosed herein, such as imaging system 200 of FIG. 2. The training data pairs generated by method 400 may be employed in a training method, such as method 700, to train a deep neural network a mapping from 2D medical images to corresponding thickness masks.

Method 400 begins at operation 402, wherein the imaging system receives a 2D medical image of a first anatomical region of an imaging subject. In some embodiments the 2D medical image is an x-ray image. The 2D medical image may include metadata pertaining to the acquisition of the 2D medical image, wherein the metadata may indicate the anatomical region imaged, one or more imaging parameters used during acquisition of the 2D medical image, a date of image acquisition, etc. The 2D medical image may be stored on non-transitory memory of the imaging system and/or transmitted to a remote device communicatively coupled to the imaging system, such as a remote image repository. The imaging system may acquire the 2D medical image via a 2D imaging device communicably coupled thereto, or from an image repository.

At operation 404, the imaging system receives a 3D medical image of the first anatomical region of the imaging subject. In some embodiments, the 2D medical image and the 3D medical image are acquired within a threshold window of time, thereby reducing differences which may occur in the first anatomical region between acquisition of the 2D medical image and the 3D medical image. In some embodiments, the threshold window of time is based on a rate of change/growth of one or more anatomical structures of the first anatomical region and/or diseases affecting one or more anatomical structures of the first anatomical region. In one example, for a rapidly evolving disease, such as pneumonia, the threshold window of time may be less than 48 hours. In another example, for more slowly evolving/changing diseases, such as a slow growing tumor, the threshold window of time may be 3 months. A threshold window of time may be greater for non-disease affected anatomical regions than for disease affected anatomical regions, as a rate of change of tissues/organs affected by a disease may be greater than an underlying rate of growth/change in said tissues/organs. when a disease does not affect the first anatomical region compared to when a disease does affect the first anatomical region. In another example, a threshold window of time may be shorter for children than for adults, as a rate of change of the anatomical structures of the first anatomical region may be greater in children than in adults.

The 3D medical image may be received from a 3D imaging device, employing one or more known 3D imaging modalities, including but not limited to CT, MRI, PET, ultrasound, mammography, etc. The imaging system used to acquire the 2D medical image at operation 402 may be the same as, or differ from, the imaging modality used to acquire the 3D medical image at operation 404. In some embodiments, the 3D medical image is a CT image, comprising a plurality of voxels representing the first anatomical region of the imaging subject in 3D. The 3D medical image may include metadata pertaining to the acquisition of the 3D medical image, wherein the metadata may indicate the anatomical region imaged, one or more imaging parameters used during acquisition of the 3D medical image, a date of image acquisition, etc. The 3D medical image may be stored on non-transitory memory of the imaging system and/or transmitted to a remote device communicatively coupled to the imaging system, such as a remote image repository. In some embodiments, both the 2D medical image acquired at operation 402, and the 3D medical image acquired at operation 404, are associated with a unique identification number, thereby linking the 2D medical image and the 3D medical image.

At operation 406, the imaging system annotates the voxels of the 3D medical image with one or more object class labels. In some embodiments, the imaging system annotates the voxels of the 3D medical image in response to input received from a user, via a user input device. In some embodiments, the imaging system automatically annotates the voxels of the 3D medical image based on a 3D segmentation mask determined by a trained deep neural network. In some embodiments, voxels of the 3D medical image are auto-annotated based on an unsupervised learning algorithm. The annotations may comprise labels, flags, or values, associated with one or more voxels of the 3D medical image. In one example, object class annotations may comprise a 3D array of values, wherein each value may indicate an object class label, and a position of a point within the 3D array may correspond to a spatial position of a voxel in the 3D medical image.

At operation 408, the imaging system projects the 3D medical image onto a 2D plane to produce a synthetic 2D image. FIG. 5 describes a method for generating synthetic 2D images from 3D images, in detail below. Briefly, the imaging system may select one or more projection parameters, such as a radiation source position, an angle of incidence of a plurality of rays emitted by the radiation source, as well as a position and orientation of a 2D projection plane. The rays emitted from the radiation source may pass through the voxels of the 3D medical image, and intersect with the 2D projection plane, wherein for each ray passing through the 3D medical image and onto the 2D projection plane, a synthetic pixel, with an associated synthetic intensity value, may be determined based on the voxels of the 3D image through which the ray passed. In some embodiments, an intensity value of a synthetic pixel of a ray may be based on an average and/or total of the intensity values of the voxels of the 3D image through which the ray traversed before intersecting with the 2D projection plane.

At operation 410, the annotations of at least the first object class of interest of the 3D medical image are projected onto the 2D plane using the same projection parameters as applied at operation 408, to produce a ground truth thickness mask. In some embodiments, the ground truth thickness mask is produced by emitting rays from the radiation source, through the 3D medical image, and onto the 2D plane, wherein, for each ray incident on the 2D plane, a thickness value is determined based on a number of voxels (annotated as belonging to the first object class of interest) through which the ray traversed. The plurality of rays emitted from the radiation source may thus be converted into a plurality of thickness values for the first object class of interest, and the plurality of thickness values, along with their spatial relationships as indicated by their position on the 2D plane, comprise the ground truth thickness mask. Although a process for generating a ground truth thickness mask for a first object class of interest is described above, it will be appreciated that the same process may be used to generate a plurality of ground truth thickness masks for a plurality of object classes of interest.

At operation 412, the imaging system registers the ground truth thickness mask produced at operation 410 with the 2D medical image acquired at operation 402. Registration comprises aligning two images such that a sum of pixel-wise differences between the two images is minimized, or conversely, that an alignment between anatomical regions captured by the two images is maximized. By registering the ground truth thickness mask with the 2D medical image, alignment between the regions of the first object class of interest depicted in the 2D medical image, and in the ground truth thickness mask, may be maximized. In some embodiments, operation 412 may comprise registering the synthetic 2D image generated at operation 408 with the 2D medical image acquired at operation 402, to obtain registration parameters (e.g., a degree of x and y translation to produce a minimization of pixel-wise differences between the 2D medical image and the synthetic 2D image), and applying these registration parameters to the ground truth thickness mask to align the thickness values of the ground truth thickness mask with their corresponding pixels in the 2D medical image.

At operation 414, the aligned ground truth thickness mask and the 2D medical image are stored together as a training data pair. In some embodiments, metadata pertaining to the training data pair may be stored along with the 2D medical image and the ground truth thickness mask. As an example, metadata may include an indication of the object class of interest, an indication of an anatomical region captured by the 2D medical image, a date of acquisition, a disease type associated with the training data pair, etc. Following operation 414, method 400 may end.

In this way, training data pairs comprising 2D medical images and corresponding ground truth thickness masks may be generated. The inventors herein discovered that, in order for a deep neural network to learn an accurate mapping from 2D medical images to thickness masks, the synthetic 2D images were inadequate for use in the training data pairs directly, as the synthetic 2D medical image and real 2D medical images are sufficiently distinct in appearance as to reduce accuracy of thickness inference during implementation on real 2D medical images. Thus, the inventors developed the approaches disclosed herein, such as method 400 described above, enabling a real 2D medical image to be paired with accurate thickness information (in the form of a thickness mask) for at least a first object class of interest captured by the real 2D image.

Turning to FIG. 5, an example method 500 for determining projection parameters for producing a synthetic 2D image from a 3D image, is shown. Method 500 may be executed by one or more of the systems described herein, such as imaging system 200 shown in FIG. 2. Method 500 may be executed as part of a method of producing training data pairs, for training a deep neural network to infer depth information from a 2D medical, such as at operation 408 of method 400.

Method 500 begins at operation 502, wherein the imaging system selects an initial set of projection parameters. Projection parameters include but are not limited to, a position of a radiation source relative to an imaging subject, a position and orientation of a 2D projection plane relative to the radiation source and the imaging subject, as well as an angle/projection direction for a plurality of rays emitted by the radiation source. Turning briefly to FIG. 6A, an exemplary schematic of a projection process is shown. FIG. 6A shows a radiation source 602, positioned a distance 604 away from an imaging subject 608, wherein imaging subject 608 is positioned between radiation source 602 and projection a plane 610. As can be seen in FIG. 6A, changing any of the position of the radiation source 602, the position or orientation of the imaging subject 608, the position or orientation of the projection plane 610, as well as the trajectory of the plurality of rays 606, may alter the projection of imaging subject 608 formed on projection plane 610.

At operation 504, the imaging system projects the 3D medical image onto the 2D plane using the currently selected projection parameters to produce a synthetic 2D image. Turning again to FIG. 6A, which provides an example of a projection process, the radiation source 602 emits a plurality of rays 606, and a subset of the plurality of rays 606 intersect with imaging subject 608. In some embodiments, the imaging subject 608 may comprise a plurality of voxels of a 3D medical image acquired via a 3D imaging device, and as one or more of the plurality of rays traverses the voxels of the imaging subject 608, a history of the travel path of said ray may be determined and/or recorded. After passing through imaging subject 608 and upon intersecting with projection plane 610, a projection of imaging subject 608 may be produced on projection plane 610 by plotting a value of each incident ray at the location of intersection between the ray and the projection plane 610, wherein the value of the incident ray may be determined based on the travel history of said ray. Turning to FIG. 6B, example synthetic 2D images 640 are shown. The synthetic 2D images 640 may be generated according to the process illustrated by FIG. 6A. Each of the synthetic 2D images 640 comprises a distinct synthetic image generated from a single imaging subject, but with application of a distinct set of projection parameters. The synthetic 2D images 640 provide an exemplary embodiment of the synthetic 2D image which may be produced at operation 504 of method 500.

At operation 506, the imaging system determines a difference between the synthetic 2D image produced at operation 504 using the currently selected projection parameters, and a corresponding 2D medical image (e.g., the medical image acquired at operation 402 of method 400). In some embodiments, the difference between the synthetic 2D image and the corresponding 2D medical image may be determined using one or more or a weighted average of a DICE score, a pixel-wise mean-squared-difference, and an extent of x and/or y translation determined by registering the synthetic 2D image with the 2D medical image.

At operation 508, the imaging system evaluates if the difference determined at operation 506 is less than a threshold difference. If at operation 508 the difference is determined to not be less than the difference threshold, method 500 proceeds to determine new projection parameters at operation 510, and returns to operation 504 to produce a new synthetic 2D image using the updated projection parameters. However, if at operation 508 the imaging system determines that the difference is less than the threshold difference, method 500 proceeds to operation 512.

At operation 512, the synthetic 2D image and the projection parameters used to obtain the synthetic 2D image are stored in non-transitory memory of the imaging system. Following operation 512, method 500 may end.

By iteratively adjusting the projection parameters until a synthetic 2D image is produced of sufficient similarity to the 2D medical image (e.g., the difference between the synthetic 2D image and the 2D medical image are below a threshold), a degree of correspondence/match between a ground truth thickness mask and a 2D medical image, may be increased, wherein the ground truth thickness mask is produced by projecting annotations of a 3D medical image onto the 2D plane using the projection parameters determined by method 500.

Figure 7:
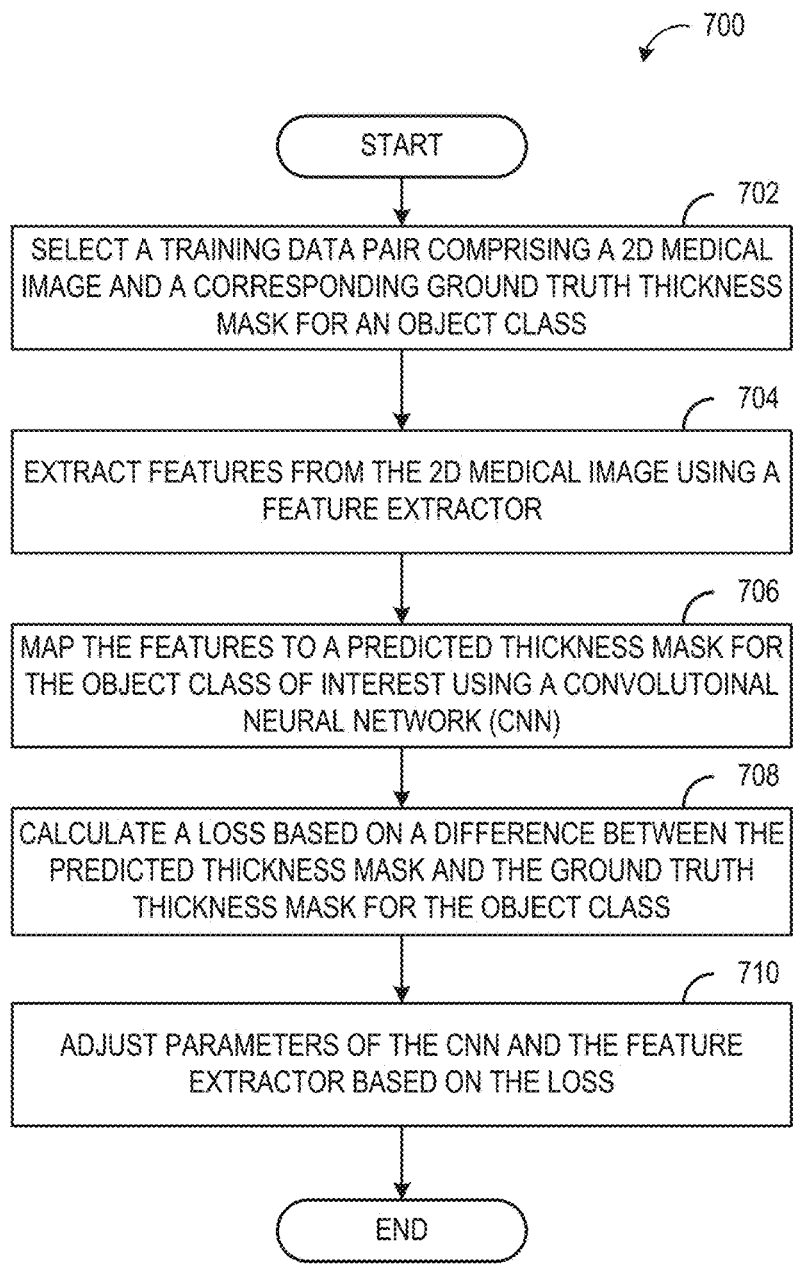
FIG. 7 is a flow chart illustrating a method for training a deep neural network to map 2D medical images to thickness masks for one or more object classes of interest, according to an exemplary embodiment.

Referring to FIG. 7, a flow chart of an exemplary method 700 for training a deep neural network (such as second CNN 108) to infer a thickness mask for an object class of interest from a 2D medical image, is shown. Method 700 may be implemented by the imaging system 200, shown in FIG. 2, based on instructions stored in non-transitory memory 206.

Method 700 begins at operation 702, where a training data pair, from a plurality of training data pairs, is fed to a deep neural network, wherein the training data pair comprises a 2D medical image of an anatomical region of an imaging subject, and a corresponding ground truth thickness mask indicating a thickness of at least a first object class of interest at each pixel of the plurality of pixels of the 2D medical image. In some embodiments, the training data pair, and the plurality of training data pairs, may be stored in an imaging system, such as in imaging data 212 of imaging system 200. In other embodiments, the training data pair may be acquired via communicative coupling between the imaging system and an external storage device, such as via Internet connection to a remote server. In some embodiments, the ground truth thickness mask includes a depth encoding vector for each of the pixels of the plurality of pixels of the 2D medical image, thereby enabling the deep neural network to learn a depth variant density or distribution of the object class of interest.

At operation 704, the imaging system extracts features from the 2D medical image using a feature extractor, similar to operation 304 of method 300, described above. In some embodiments, the feature extractor comprises one or more learnable/adjustable parameters, and in such embodiments, said parameters may be learned by execution of method 700. In some embodiments, the feature extractor comprises hard-coded parameters, and does not include learnable/adjustable parameters, and in such embodiments the feature extractor is not trained during execution of method 700.

At operation 706, the imaging system maps the features to a predicted thickness mask for at least the first object class of interest, using a deep neural network. In some embodiments, the deep neural network comprises a CNN, comprising one or more convolutional layers, comprising one more convolutional filters. The deep neural network maps the features to the predicted thickness mask by propagating the features from the input layer, through one or more hidden layers, until reaching an output layer of the deep neural network.

At operation 708, the imaging system calculates a loss for the predicted thickness mask based on a difference between the predicted thickness mask and the ground truth thickness mask. In one embodiment, the loss comprises a mean-squared-error, given by the following equation:

$$MSE = \frac{1}{N}\sum_{i=0}^{N}(x_i - X_i)^2$$

Where MSE stands for mean-squared-error, N is the total number of training data pairs, i is an index indicating the currently selected training data pair, $x_i$ is a predicted thickness mask for training data pair i, and $X_i$ is a ground truth thickness mask for training data pair i. The expression $x_i-X_i$ will be understood to represent pair-wise subtraction of each pair of corresponding thickness values in the predicted thickness mask and the ground truth thickness mask, for the currently selected training data pair i. It will be appreciated that other loss functions known in the art of machine learning may be employed at operation 708.

At operation 710, the weights and biases of the deep neural network are adjusted based on the loss determined at operation 708. In some embodiments, the parameters of the feature extractor, and the CNN, may be adjusted to reduce the loss over the training data set. In some embodiments, the feature extractor may not include a learnable parameter, and therefore operation 710 may not include adjusting parameters of the feature extractor. In some embodiments, back propagation of the loss may occur according to a gradient descent algorithm, wherein a gradient of the loss function (a first derivative, or approximation of the first derivative) is determined for each weight and bias of the deep neural network. Each weight (and bias) of the deep neural network is then updated by adding the negative of the product of the gradient determined (or approximated) for the weight (or bias) with a predetermined step size. Method 700 may then end. It will be noted that method 700 may be repeated for each of a plurality of training data pairs in a training data set, and this process may be repeated until a stop condition is met. Wherein, in some embodiments, the stop condition comprises one or more of the loss decreasing to below a threshold loss, a rate of loss change decreasing to below a threshold rate of loss change, a validation loss, determined over a validation data set, reaching a minimum, etc. In this way, the feature extractor may learn to extract features correlated with thickness for an object class of interest, and a CNN may learn to map said features to a thickness mask for a 2D medical image.

Turning to FIG. 10, an exemplary embodiment of a spatial regularization approach 1000 which may be applied to the output of a CNN layer, such as the first CNN 106 or and/or the second CNN 108, is shown. The inventors herein determined that noise of an output parameter determined by a trained neural network, such as a thickness value for a class of interest, may be reduced by applying a spatial regularization constraint, wherein an output value is modified based on other output values in a spatially local region (e.g., neighboring pixels/voxels). FIG. 10 shows a 2D medical image 1002, comprising a first region 1004, a second region 1006, a third region 1008, and a fourth region 1010, wherein first filter 1014 is applied to first region 1004, a second filter 1016 is applied to second region 1006, third filter 1018 is applied to the third region 1008, and fourth filter 1020 is applied to fourth region 1010, to produce a first feature $f_0$, a second feature $f_1$, a third feature $f_2$, and a fourth feature $f_3$, respectively. The spatial regularization factors, $W_0$, $W_1$, $W_2$, and $W_3$ are applied to corresponding features to produce spatially regularized outputs. More specifically, in the example shown by spatial regularization approach 1000, the first feature $f_0$ is multiplied by first spatial regularization factor $W_0$, the second feature $f_1$ is multiplied by second spatial regularization factor $W_1$, the third feature $f_2$ is multiplied by third spatial regularization factor $W_2$, and the fourth feature $f_3$ is multiplied by fourth spatial regularization factor $W_3$, to produce a corresponding plurality of spatially regularized features, which may be used as a feature map for a subsequent layer or may comprise output values, such as thickness values for a class of interest. The spatial regularization factors may be determined as a function of the features extracted in neighboring regions of an input feature map or image. In some embodiments, the spatial regularization factors are determined such that an absolute value of a difference between any two proximal feature values is less than a threshold difference.

Turning to FIG. 11, a process 1100 by which a depth information encoding vector 1130 may be produced, is shown. Process 1100 includes obtaining an intensity profile 1106 along a line 1104 taken across a depth-wise image 1102, wherein a position of line 1104 corresponds to point 1140 of 2D medical image 1160. The intensity profile 1106 encodes depth information for object structures extending into the plane of 2D medical image 1160 at point 1140. The intensity profile 1106 may be quantized into a finite number of discrete intensity bands, such as first intensity band 1108, second intensity band 1110, and third intensity band 1112. Each distinct intensity band may represent a different object class of interest, and/or a distinct density for a single object class of interest. Each of the first intensity band 1108, the second intensity band 1110, and the third intensity band 1112, may be used to generate depth information encoding vector 1130, corresponding to point 1140 of 2D medical image 1160. A similar process may be conducted for each point of 2D medical image 1160, to produce a plurality of depth information encoding vectors. The depth information encoding vectors may be used in place of, or in addition to, the thickness values of the thickness masks described herein, to enable a deep neural network to infer not only a thickness of an object class of interest, but depth position and distribution of the object class of interest, at each point of a 2D medical image.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A medical imaging system comprising:
an imaging device;
a display device;
a memory, storing:
  a feature extractor;
  a first trained convolutional neural network (CNN);
  a second trained CNN; and
  instructions;
a processor communicably coupled to the imaging device, the display device, and the memory, and when executing the instructions, configured to:
  acquire a two-dimensional (2D) medical image of an anatomical region of an imaging subject via the imaging device;
  extract features from the 2D medical image using the feature extractor;
  map the features to a segmentation mask for an object class of interest using the first trained CNN;
  map the features to a thickness mask for the object class of interest using the second trained CNN, wherein the thickness mask indicates a thickness of the object class of interest at each pixel of a plurality of pixels of the 2D medical image;
  apply the segmentation mask to the thickness mask to produce a segmented thickness mask; and
  display the segmented thickness mask via the display device, wherein the segmented thickness mask is displayed as a thickness heat-map for the object class of interest overlaid on the 2D medical image.

2. The medical imaging system of claim 1, wherein the features include a total object thickness at each pixel of the plurality of pixels of the 2D medical image.

3. The medical imaging system of claim 1, wherein the processor, when executing the instructions, is further configured to:
determine a volume of the object class of interest by approximating an integral of the segmented thickness mask.

4. The medical imaging system of claim 3, wherein determining the volume of the object class of interest by approximating the integral of the segmented thickness mask comprises forming a 3D surface with plurality of points in 3D space based on the segmented thickness mask and approximating the integral of the 3D surface to determine the volume.

5. The medical imaging system of claim 1, wherein the segmented thickness mask comprises a matrix of thickness values for the object class of interest, and wherein the processor is configured to display the segmented thickness mask as a pseudo-three-dimensional (3D) image by plotting each thickness value of the matrix of thickness values at a z-position corresponding to the thickness value.

6. The medical imaging system of claim 1, wherein applying the segmentation mask to the thickness mask to produce the segmented thickness mask comprises multiplying each value of the thickness mask by a spatially corresponding value of the segmentation mask to produce the segmented thickness mask.

7. The medical imaging system of claim 1, wherein the processor, when executing the instructions, is further configured to:
map the segmentation mask, the thickness mask, and the features to a pathology prediction using a trained classifier.

8. The medical imaging system of claim 7, wherein the pathology prediction is displayed via the display device.

9. The medical imaging system of claim 7, wherein the trained classifier comprises a fully connected neural network, and an output layer of the trained classifier includes one or more regression nodes, wherein each of the one or more regression nodes corresponds to a distinct pathology, and an output of a respective regression node is a predicted probability of the corresponding distinct pathology.

10. The medical imaging system of claim 1, wherein the object class of interest comprises a disease affected region.

11. The medical imaging system of claim 1, wherein the imaging device is an x-ray imaging device.

12. The medical imaging system of claim 1, wherein the second trained CNN is trained with training data comprising a plurality of 2D training images and a plurality of corresponding ground truth thickness masks.

13. The medical imaging system of claim 12, wherein the training data includes a training data pair comprising a 2D training image of a patient selected from the plurality of 2D training images and a corresponding ground truth thickness mask of the plurality of corresponding ground truth thickness masks, and wherein the corresponding ground truth thickness mask is generated from a 3D image of the patient.

14. The medical imaging system of claim 13, wherein the 3D image is an annotated 3D image, the annotated 3D image including a first plurality of annotated voxels, the first plurality of annotated voxels annotated with object class labels for a first object class of interest, wherein generating the ground truth thickness mask from the 3D image of the patient comprises:
projecting the annotated 3D image along a plurality of rays onto a plane to produce a synthetic 2D image matching the 2D training image;
projecting the first plurality of annotated voxels along the plurality of rays onto the plane to produce a first plurality of thickness values for the first object class of interest; and
producing the ground truth thickness mask for the first object class of interest from the first plurality of thickness values.

15. The medical imaging system of claim 14, wherein the second trained CNN is trained by:
mapping, with an untrained or partially trained version of the second trained CNN, the 2D training image to a first predicted thickness mask for the first object class of interest;
determining a loss for the first predicted thickness mask based on a difference between the first predicted thickness mask and the ground truth thickness mask; and
updating parameters of the untrained or partially trained version of the second trained CNN based on the loss.

16. The medical imaging system of claim 14, wherein the ground truth thickness mask comprises a plurality of vectors, wherein each of the plurality of vectors encodes a length of one or more object class labels traversed by a ray of the plurality of rays, through the object class labels, and onto the plane.

17. The medical imaging system of claim 14, wherein the ground truth thickness mask comprises a plurality of vectors, wherein each of the plurality of vectors encodes a depth dependent density of the first object class of interest traversed by a ray of the plurality of rays, through the object class labels, and onto the plane.

18. The medical imaging system of claim 1, wherein the object class of interest comprises a tissue type.

19. The medical imaging system of claim 1, wherein the object class of interest comprises an organ.

* * * * *